July 17, 1956     D. A. WALLACE ET AL     2,754,934
VEHICLE HOISTING APPARATUS
Filed July 30, 1952     4 Sheets-Sheet 1

INVENTORS
David A. Wallace
Paul Eugene Wallace
BY
Robert E. Harris
ATTORNEY

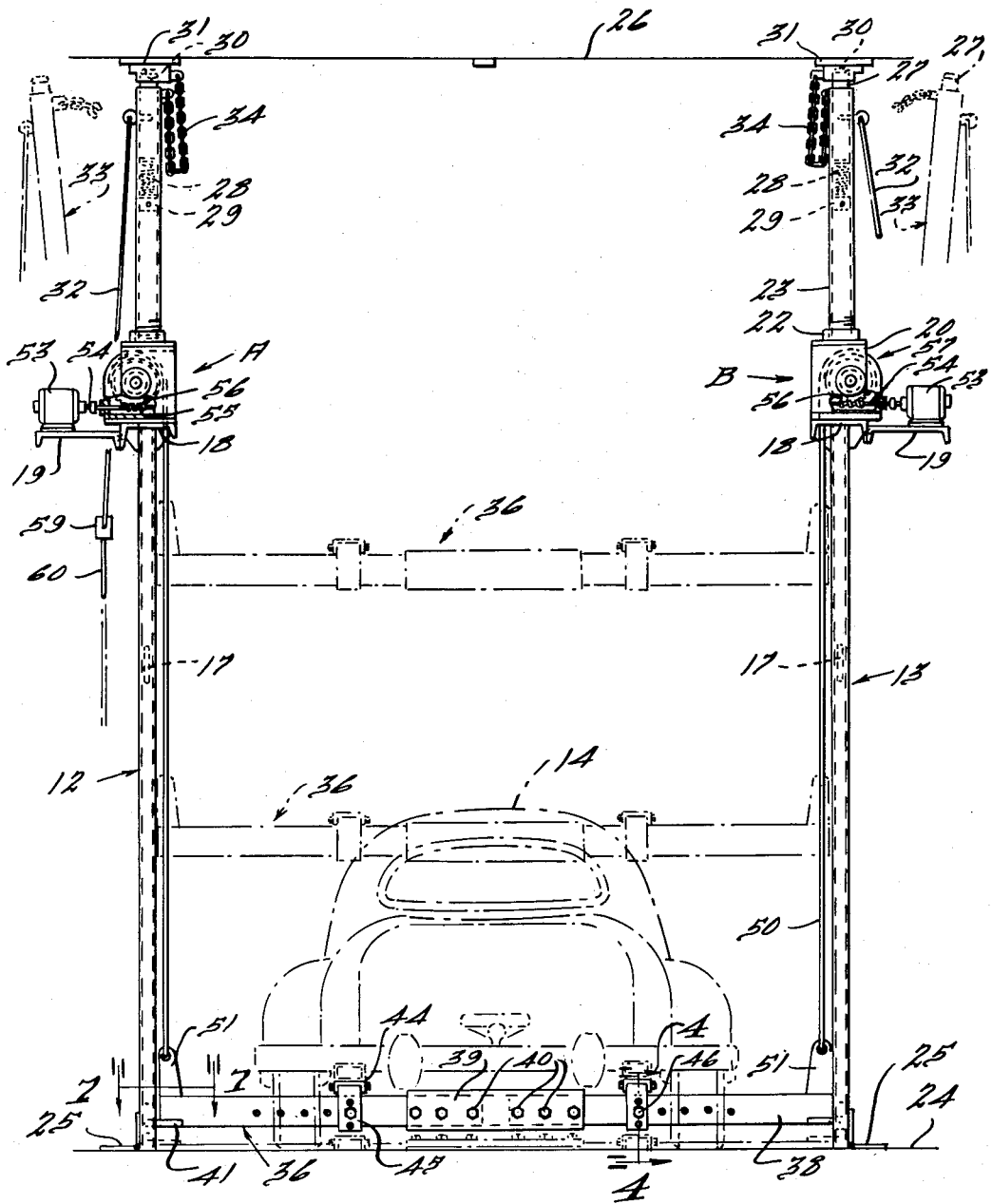

July 17, 1956 D. A. WALLACE ET AL 2,754,934
VEHICLE HOISTING APPARATUS
Filed July 30, 1952 4 Sheets-Sheet 3
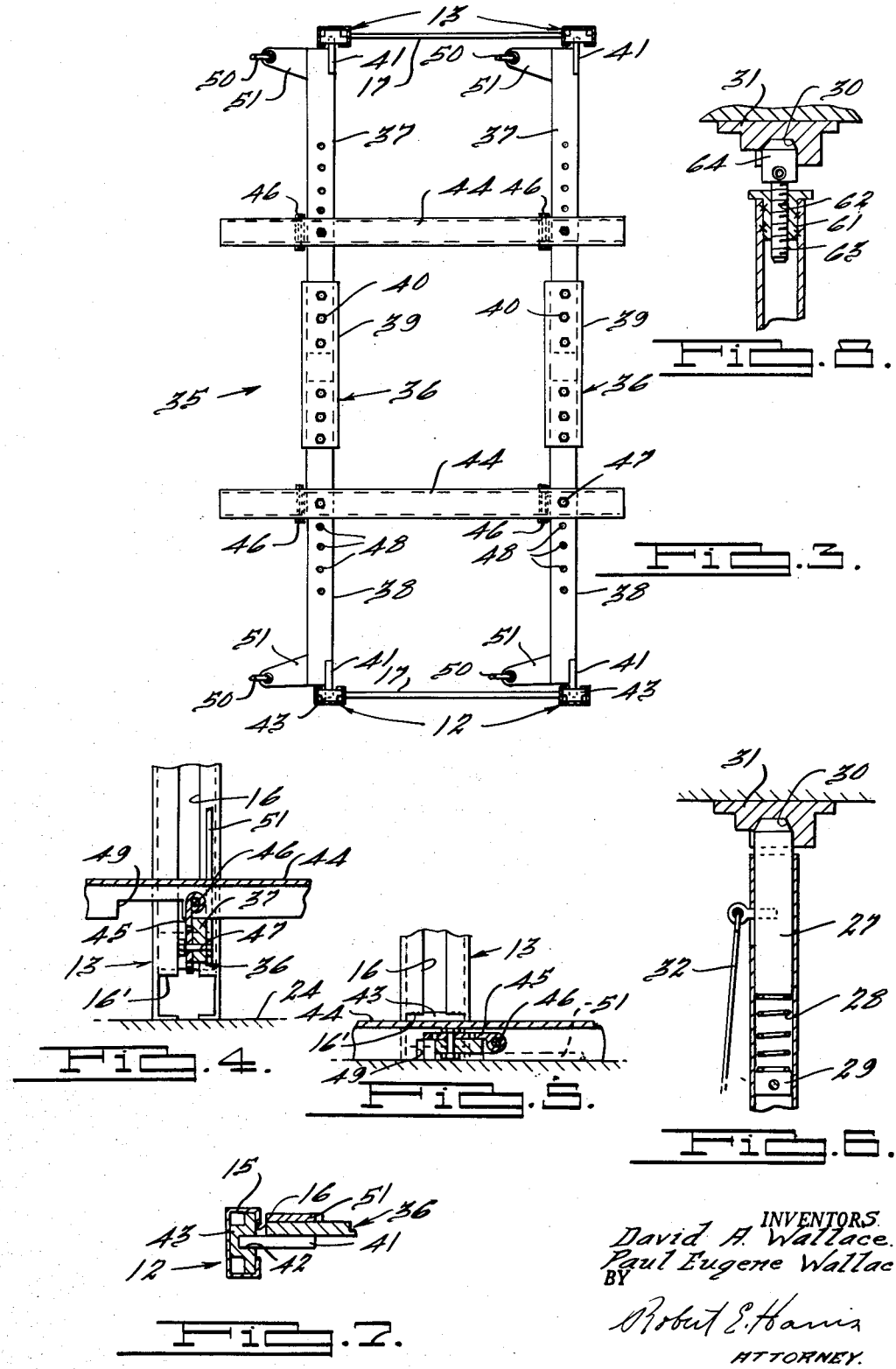
INVENTORS.
David A. Wallace.
Paul Eugene Wallace.
BY
Robert E. Harris
ATTORNEY.

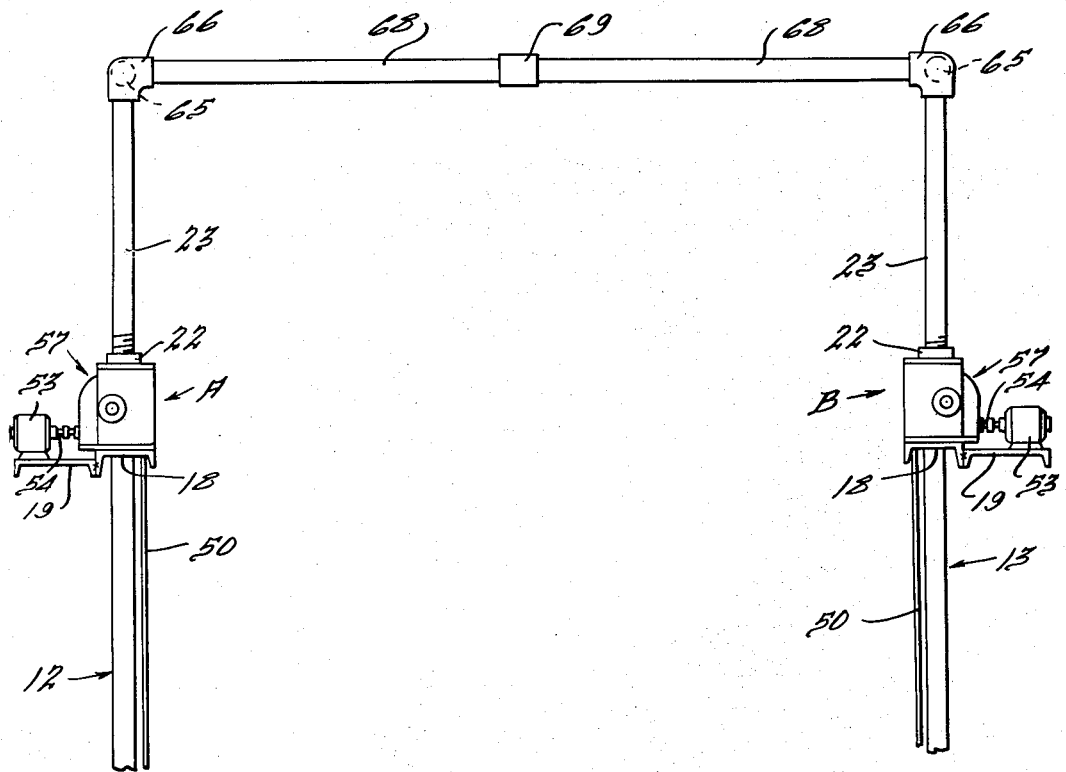
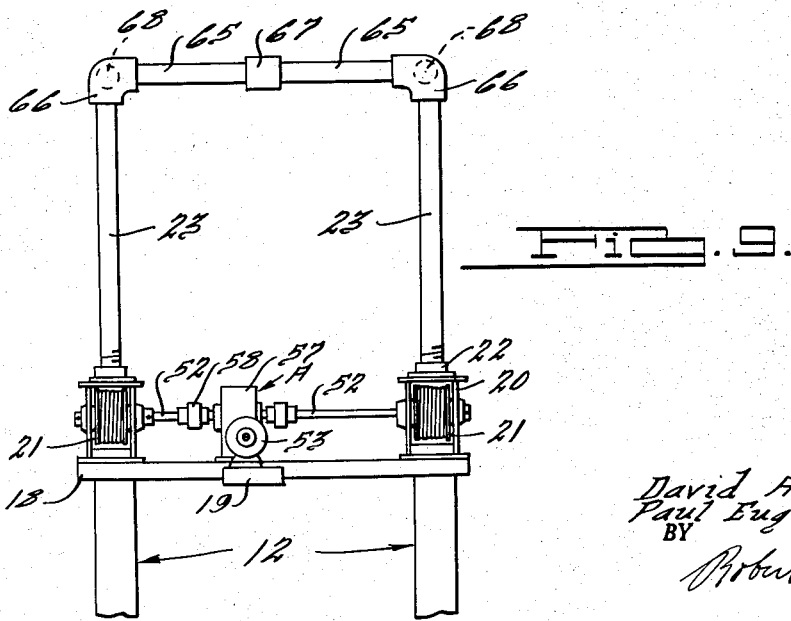

United States Patent Office
2,754,934
Patented July 17, 1956

2,754,934

VEHICLE HOISTING APPARATUS

David A. Wallace, Grosse Pointe Farms, and Paul Eugene Wallace, Detroit, Mich.; said Paul Eugene Wallace assignor to said David A. Wallace Application July 30, 1952, Serial No. 301,626

7 Claims. (Cl. 187—8.59)

This invention relates to an improved vehicle hoist.

More particularly the invention pertains to a vehicle hoist which has all of its vertically disposed lifting and supporting members spaced laterally outwardly from the path through which the vehicle is moved in its upward and downward movements.

One of the main objects of the invention is to provide a hoist of this kind which is so designed as to facilitate the use in its construction of mainly standard steel stock sections and parts.

Another object of the invention is to provide upright vehicle lifting and supporting members in a hoist of this kind which can be mounted between the floor and ceiling of a garage or other enclosure without requiring projection of any significant portions thereof either above the ceiling or below the floor.

Another object of the invention is to provide upright members of this kind which are adjustable in effective length for fitting them to enclosures in which the spacings of the ceilings and floors vary.

A further object of the invention is to provide pairs of connected upright members or posts on opposite sides of the hoisting apparatus which are pivotally mounted at their lower ends on the floor of an enclosure and releasably coupled to the ceiling so as to accommodate outward inclination of the upright members during driving of a vehicle into position to be lifted and between the opposite pairs of posts.

An additional object of the invention is to provide for the upright posts of hoisting apparatus of this kind, jack structures that may be alternatively used in place of the releasable ceiling coupling means in order to permanently fix the uprights between the floor and ceiling of the enclosure.

Another object of the invention is to provide collapsible vehicle receiving seat structures in hoisting apparatus of this kind which fold under the action of gravity into unobstructing position upon the floor of the enclosure and which readily accommodate driving of the vehicle thereover.

Additional objects of the invention are to provide load receiving seat structures in a hoist of this character which contact with normally horizontal, straight parts of the frame of a vehicle on opposite sides thereof and which are so located as to not obstruct access to the underlying parts of the vehicle; to provide simple, economical and efficient power driven mechanism for lifting and controlling the lowering of the load receiving seat structure and vehicle seated thereon; to provide in such driving mechanism, gearing having a worm thread of irreversible pitch in order to accommodate lifting of the load by rotation of the gearing in one direction, retaining of the load in elevated position by the irreversible pitch of the thread of the worm and lowering of the load by driving the gearing in a reverse direction; and to provide a power drive gearing unit of substantially identical construction on each pair of side posts for lifting opposite ends of a vehicle support uniformly.

An illustrative embodiment of the invention is shown in the accompanying drawings in which:

Fig. 2 is a right end elevational view of the hoisting apparatus shown in Fig. 1, illustrating the vehicle in rear end elevation.

Fig. 3 is a horizontal sectional view of the hoisting apparatus taken on line 3—3 of Fig. 1.

Fig. 4 is a fragmentary vertical sectional view taken on line 4—4 of Fig. 2 and showing the load receiving seat portion thereof in its initial elevated position preparatory to contacting the frame of the vehicle to be lifted.

Fig. 5 is a view similar to Fig. 4 but illustrating the load receiving seat portion thereof in its lower position.

Fig. 6 is a fragmentary vertical sectional view taken on line 6—6 of Fig. 1.

Fig. 7 is a fragmentary sectional view taken on line 7—7 of Fig. 2.

Fig. 8 is a fragmentary sectional view similar to Fig. 6 but showing a ceiling anchoring structure for the upright posts of the hoist which includes a modified embodiment of the invention.

Fig. 9 is a fragmentary end view of a hoisting unit showing a further development of the invention.

Fig. 10 is a fragmentary side view of the hoisting unit shown in Fig. 9.

Figure 1:
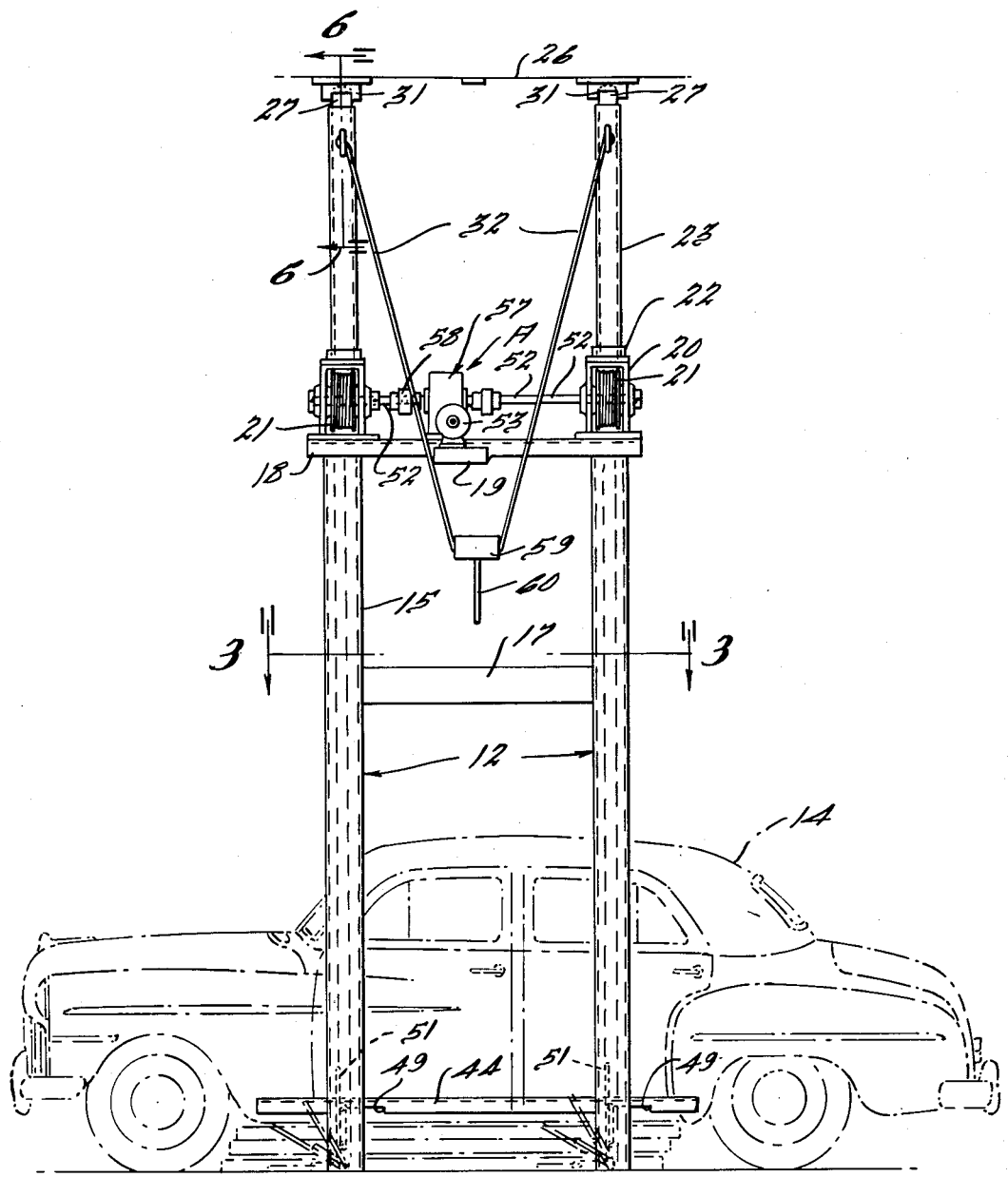
Fig. 1 is a side elevational view of the improved hoisting apparatus illustrating a vehicle, also in side elevations, in position to be lifted.

In the form of the invention illustrated in Figs. 1 to 7 inclusive, the improved vehicle hoist comprises two spaced pairs of posts, generally designated by the numerals 12 and 13, respectively, between which a vehicle shown in dotted lines at 14 is widthwise receivable.

Each of the posts 12 and 13 comprise a lower element 15 which is of box shape section as shown in Fig. 7. The post elements 15 are of standard stock steel structure and they are provided on their facing sides with longitudinally extending slots 16. Inasmuch as all of the posts are substantially identical, the description of one will serve for all.

The posts of each pair of posts 12 are connected together by a horizontal member 17 which extends between the lower elements 15 of the posts and the posts are connected at their upper end by a horizontal platform 18 on which is mounted a second downwardly stepped platform section 19. Mounted on each end portion of the horizontal platform 18 is a casing structure 20 within which is disposed a drum 21 hereinafter more clearly described. The casing 20 is provided on its upper wall with a collar 22 in which is threaded or otherwise suitably secured an upright tubular member 23 which provides the upper end portion of each post.

The lower end of each post 12 and 13 is pivotally mounted on a floor, generally designated by the numeral 24, by a hinge 25. The hinges 25 are arranged on the outer sides of the posts 12 and 13 so as to accommodate outward pivotal movement of each pair of posts 12 and 13 relative to each other. This movement is particularly adapted to effectively space the posts further apart in order to allow passage of a vehicle therebetween.

The upper end portions of the posts 12 and 13 are releasably secured to the ceiling 26 of an enclosure in which the hoist structure is located by plungers 27 which are axially slidably mounted in the tubular upper sections 23 of the posts and yieldably urged outwardly by springs 28 disposed within the posts and which bear between abutments 29 within the tubular sections 23 and the lower ends of the plungers 27. The upper end portions of the plungers 27 are receivable in sockets 30 of brackets 31 which are rigidly mounted on the ceiling structure 26. Each plunger 27 of the posts 12 and 13 are provided with a control chain or cable 32 by which the plungers may be retracted downwardly to withdraw their upper ends from the sockets 30 and thus allow the posts of one pair of posts to be rotated outwardly with respect to the other pair of posts to the dot and dash line positions shown at 33 in Fig. 2. Each post 12 and 13 is also provided with a stop chain 34, one end of which is attached to a post and the other end of which is attached to the associated bracket 31 in order to limit outward swinging movement of the posts about the hinges 25.

The hoisting unit is provided with a load receiving seat generally designated by the numeral 35 in Fig. 3. This load receiving seat comprises a pair of cross bars, generally designated by the numeral 36, each of which comprise end sections 37 and 38 and a connecting sleeve member 39 by which the end sections 37 and 38 may be selectively rigidly coupled together in different positions relative to each other by bolts 40. The effective lengths of the cross bars 36 may thus be adjustably predetermined to accommodate various spacings of the pairs of posts 12 and 13 from each other as may be required to lift selected vehicles or as may be required to accommodate placement of the hoisting apparatus in an available space. Each cross bar 36 has a trunnion 41 on its respective opposite ends which is journaled in an aperture 42, formed in a shiftable shoe 43 which is longitudinally slidably mounted within each post 12 and 13. The trunnions 41 are located along one edge of the cross bars 36, as shown in Fig. 2, in order to allow the cross bars to swing downwardly as illustrated in Figs. 3 and 5 so that only the thickness of the cross bar sections 37 are presented in opposition to driving of a vehicle over the seat structure 35. The shoes 43 are adapted to be inserted into the interior of the hollow lower sections 15 of the posts 12 and 13 through the enlarged lower end portions 16' of the slots 16 which are shown in Fig. 4. These enlarged lower end portions 16' of the slots 16 also accommodate the shoes 43 during outward swing of the posts 12 and 13 when the load receiving seat 35 is in its lowermost position.

The cross bars 36 are connected together by vehicle frame engaging members 44, each of which comprise a channel bar. These channel bars 44 extend longitudinally of the vehicle 14 and are swingably pivotally attached to the cross bar 36 by links 45 which are pivotally connected at 46 to the channel members 44 and rigidly clamped to the cross bars 36 by bolts 47. The links 45 are provided with a plurality of spaced apertures by which they may be selectively positioned with respect to the cross bars 36 so as to vary the effective lengths of the links 45. As the cross bars 36 are turned about the axes of the trunnions 41, in a manner hereinafter more clearly set forth, the vehicle frame contacting channel members 44 are shifted upwardly while being retained in truly horizontal planes. The web portions of the channel members 44 are adapted to contact with the relatively straight horizontal frame portions of a vehicle which are normally disposed between the front and rear wheels thereof. The frame engaging elements 44 may be selectively positioned widthwise of the vehicle by selectively inserting the bolts 47 through the apertures 48 which are arranged longitudinally of the cross bars 36 to accommodate this adjustment. The side walls of the vehicle frame contacting channel members 44 are provided with notches 49 in which the cross bars 36 are receivable when the seat structure is in its lowermost position as illustrated in Fig. 5.

The load receiving seat structure is adapted to be pivoted upwardly from its lowermost position shown in Fig. 5 to the position shown in Fig. 4 by four cables 50, one of which is attached to the outer end of an extension arm 51 secured to each end of each cross bar 36, respectively, as shown in Fig. 3. The upper ends of the cables 50 are attached to the cable winding drums 21 which are mounted within the casings 20 on shafts 52. The cable winding drum 21 of the posts of each pair of posts 12 is provided with its driving mechanism A and the cable winding drum of each post of the pair of posts 13 is provided with its driving mechanism B. The drive mechanisms A and B are identical and therefore the description of one will suffice. The driving mechanism A, for example, which is shown in Fig. 1, comprises a motor 53 which is mounted on the platform 19 and which has a shaft 54 on which is provided a worm 55. The worm 55 is meshed with a worm gear 56 of a transmission unit 57 which is mounted on the platform 18. The shaft 52 of each cable winding drum 21 is connected by a coupling 58 with the gear unit 57 as shown in Fig. 1. The pitch of the worm and the pitch of the teeth of the gear are irreversible and thus the worm gear cannot drive the worm.

In operation of the hoist shown in Figs. 1 to 7 inclusive and in hoists embodying the modifications hereinafter set forth, the vehicle 14 is driven between the pairs of posts 12 and 13 while the load receiving seat structure 35 is in its lowermost position as illustrated in dotted lines in Fig. 1 and in full lines in Fig. 5. After the vehicle is in place, the electric motor 53, which is a reversible motor, is operated to wind the upper end portions of the cable upon the cable winding drums 21. Both motors 57 of the respective pairs of posts 12 and 13 are adapted to be simultaneously energized to wind and unwind the upper end portions of the cables on the drums 21, respectively, by a conventional electric circuit not shown through the aid of suitable switch mechanism not shown, all of which is conventionally used in the operation of reversible motors. When the motors 57 are operated so as to wind the upper end portions of the cables on the cable winding drums 21, the initial effect upon the load receiving seat is to swing it upwardly to bring the vehicle frame contacting channel bars 44 into close or contacting relationship with respect to the normally straight horizontal frame portions on opposite sides of the vehicle between the front and rear wheels thereof. Further winding of the upper end portions of the cables 50 upon the drums 21 results in upward shifting of the entire load receiving seat structure. During this upward shifting action, the movement of the load receiving seat is effectively guided by the sliding engagement of the shoes 43 in the interior of the hollow post sections 15. The vehicle may be stopped in its upward movement at any desired elevation by stopping the operation of the motor 57 and the vehicle will be held at rest in such an elevated position until the motors 57 are driven in a reverse direction to unwind the cables by the irreversible pitch of the worm and worm gear 55 and 56, respectively.

In the form of the invention shown in Figs. 1 to 7, the upper tubular post sections 23 can readily be disengaged from the ceiling structure to allow the posts to swing outwardly by pulling on the cables 32 which are connected together by a weighted block 59 to which is attached a pull cord 60. The cables 32 of each pair of posts 12 and 13 are similarly connected together.

In the form of the invention shown in Fig. 8, the hoist structure is identical to that shown in Figs 1 to 7 except the spring pressed plungers are omitted and a sleeve 61 is welded in the upper end portion of each tubular post section 23. Each sleeve 61 has a threaded internal passage 62 in which is threaded a stem 63 having a head 64 on its upper extremity that is adapted to be received in the socket 30 of the ceiling bracket 31. This provides a jack structure by which the upper end portion of each post of the pairs of posts 12 and 13 may be expansively and somewhat permanently, but releasably, fixed to the ceiling of the enclosure in which the hoist structure is located.

In the form of the invention illustrated in Figs. 9 and 10, the hoist structure is identical to that shown in Figs. 1 to 7 inclusive, except that in place of either the jack structure shown in Fig. 8 or the spring pressed plungers shown in Figs. 1 to 7, the upper end portions of the tubular sections 23 of each post are connected together by lengths of pipe or other suitable bracing structure shown in Figs. 9 and 10. As shown in Fig. 9, the posts of the pair of posts 12 at the side of the hoist structure are connected together by pipes 65 which are coupled at their ends by elbows 66 to each upper post section 23, the pipes 65 being coupled together at their adjacent ends by a nipple 67. The posts of the pair of posts 13 are similarly connected together by piping structure. As shown in Fig. 10, the posts of the pair of posts 12 are connected to the posts of the pair of posts 13 by pipe sections 68 which are connected together by a nipple 69. The outer end portions of the pipe sections 68 are threaded into the elbows 66 as shown in Fig. 10, the elbows 66 each having three openings for receiving pipe sections 65, 68 and post sections 23, respectively. The overhead reinforcing structure shown in the form of the invention illustrated in Figs. 9 and 10 is particularly adapted to be used in an enclosure having an excessively high ceiling which is not available for supporting the upper ends of the posts and is particularly useful when the hoisting unit is mounted outside an enclosure where no ceiling structure is available.

While we have illustrated and described but one embodiment of our invention, it is to be understood that such is for the purpose of illustration only, and it is contemplated that those skilled in the art may modify certain details without departing from the spirit and scope of the invention as defined in the claims appended hereto.

We claim:

1. A vehicle hoist including laterally spaced upright supporting members between which is widthwise receivable a vehicle to be lifted, a vehicle receiving and supporting seat structure disposed between said members, comprising spaced bars extending between and having opposite end portions pivotally mounted on said members and having vehicle frame engaging elements pivotally mounted on said spaced bars and extending transversely thereof for contacting longitudinal frame portions of said vehicle, elements on said seat structure shiftably connected with said members for guiding said seat structure in a substantially vertical path between said members, and means coacting between said members and said pivotally mounted bars of said seat structure for initially shifting said frame engaging elements of said seat structure into proximity to said frame portions and then drivingly shifting said seat structure along said path.

2. A vehicle hoist including laterally spaced pairs of hollow metal upright posts, the facing sides of the posts of said laterally spaced pairs having longitudinally extending restricted slots, a vehicle supporting seat structure disposed between said laterally spaced pairs of posts, a shoe confined and shiftably mounted in the interiors of each of said posts for movement longitudinally thereof, said shoes having portions overlapping the lateral extremities of said slots for holding them against movement through said slots, elements mounted on said seat structure each extending through one of said slots and pivotally attached to one of said shoes respectively for pivotally supporting said seat structure on said posts and shiftably guiding the same in a substantially vertical path between said laterally spaced pairs of posts, and means connected with said seat structure at locations offset from the pivotal axes of said elements for initially pivoting said seat structure relative to said posts into alignment with a selected portion of a vehicle and for thereafter shifting said seat structure upwardly and downwardly along said path.

3. A vehicle hoist including laterally spaced upright supporting members between which is widthwise receivable a vehicle to be lifted, a vehicle supporting seat structure disposed between said members comprising a pair of flat bars and a pair of vehicle frame engaging elements extending transversely of said bars, means pivotally connecting said frame engaging elements to said bars, means pivotally and shiftably connecting the ends of said bars to said supporting members for accommodating turning thereof about longitudinally extending axes to bring only the thickness of said bars into obstructing relation with respect to the wheels of said vehicle during driving of the latter between said supporting members, and means for shifting said seat structure upwardly and downwardly in a path between said supporting members comprising cables attached to said bars and driving mechanism for operating said cables.

4. A vehicle hoist including laterally spaced upright supporting members between which is widthwise receivable a vehicle to be lifted, a vehicle supporting seat structure disposed between said members comprising a pair of flat bars and a pair of vehicle frame engaging elements extending transversely of said bars, means pivotally connecting said frame engaging elements to said bars, means pivotally and shiftably connecting the ends of said bars to said supporting members for accommodating turning thereof about longitudinally extending axes to bring only the thickness of said bars into obstructing relation with respect to the wheels of said vehicle during driving of the latter between said supporting members, and means for shifting said seat structure upwardly and downwardly in a path between said supporting members.

5. A vehicle hoist including laterally spaced upright supporting members between which is widthwise receivable a vehicle to be lifted, a vehicle supporting seat structure disposed between said members, a pair of spaced bars extending between and pivotally and shiftably mounted at their opposite ends on said supporting members and including substantially parallel vehicle chassis engaging elements extending transversely of and swingably mounted on said bars, cables attached to said bars at locations spaced from the axes of pivotal movement thereof adapted when pulled upwardly to initially pivotally swing said elements into close proximity to the chassis of said vehicle and to subsequently lift said seat structure and the vehicle thereon, and driving mechanism for pulling said cables upwardly.

6. A vehicle hoist including laterally spaced upright supporting members between which is widthwise receivable a vehicle to be lifted, a vehicle supporting seat structure disposed between said members, a pair of spaced bars extending between and pivotally and shiftably mounted at their opposite ends on said supporting members and including substantially parallel vehicle chassis engaging elements extending transversely of and swingably mounted on said bars, cables attached to said bars at locations spaced from the axes of pivotal movement thereof adapted when pulled upwardly to initially pivotally swing said elements into close proximity to the chassis of said vehicle and to subsequently lift said seat structure and the vehicle thereon, and driving mechanism for pulling said cables upwardly, said driving mechanism including a drum for winding said cable and a reversible motor and transmission mechanism driven thereby provided with a worm element having an irreversible pitch for holding said drum against unwinding said cable when said motor is at rest.

7. A load receiving seat for vehicle hoisting apparatus comprising a pair of substantially parallel bars spaced apart a distance less than the distance between the front and rear wheels of a vehicle to be lifted, a pair of vehicle chassis engaging members extending transversely of and above said bars, means pivotally connecting said members to longitudinal edge portions of said bars, said pivotal connecting means being adapted to accommodate shifting of said members toward and away from the chassis of said vehicle as said bars are rotated from an approximate horizontally flat position to a vertically edgewise position, respectively, and means for attaching a lifting member to each end portion of each of said bars respectively comprising extensions projecting laterally outwardly from the said longitudinal edge portions of said bar, said means being adapted to initially shift said members toward said vehicle chassis by bringing said bars into their vertical edgewise positions and to thereafter shift said members into lifting contact with said vehicle chassis.

References Cited in the file of this patent

UNITED STATES PATENTS

| | | |
|---|---|---|
| 1,078,998 | Ernst | Nov. 18, 1913 |
| 1,688,507 | Schuh | Oct. 23, 1928 |
| 2,150,628 | Mizer | Mar. 14, 1939 |
| 2,238,573 | Steedman | Apr. 15, 1941 |
| 2,593,635 | Walker | Apr. 22, 1952 |
| 2,655,223 | Villars | Oct. 13, 1953 |

FOREIGN PATENTS

| | | |
|---|---|---|
| 441,280 | Great Britain | Jan. 16, 1936 |